US009399286B2

(12) United States Patent
Cibert

(10) Patent No.: US 9,399,286 B2
(45) Date of Patent: Jul. 26, 2016

(54) BENDING AND TWISTING MECHANISM AND ITS APPLICATIONS TO ROBOTICS AND ENERGY CONVERSION

(71) Applicant: ALDEBARAN ROBOTICS, Paris (FR)

(72) Inventor: Christian Cibert, Paris (FR)

(73) Assignee: ALDEBARAN ROBOTICS, Paris (FR)

( * ) Notice: Subject to any disclaimer, the term of this patent is extended or adjusted under 35 U.S.C. 154(b) by 497 days.

(21) Appl. No.: 14/038,335

(22) Filed: Sep. 26, 2013

(65) Prior Publication Data

US 2015/0082935 A1  Mar. 26, 2015

(51) Int. Cl.
*B25J 17/00* (2006.01)
*B25J 9/00* (2006.01)

(52) U.S. Cl.
CPC .............. *B25J 9/0075* (2013.01); *Y10S 901/01* (2013.01); *Y10S 901/48* (2013.01); *Y10T 74/20329* (2015.01)

(58) Field of Classification Search
CPC .......... B25J 9/0075; B25J 9/065; B25J 17/00; Y10S 901/01
See application file for complete search history.

(56) References Cited

U.S. PATENT DOCUMENTS

| | | | | |
|---|---|---|---|---|
| 4,751,821 A * | 6/1988 | Birchard | ................... | A61F 2/58 60/527 |
| 6,237,241 B1 * | 5/2001 | Aaron | ................. | B25J 17/0266 33/268 |
| 7,117,673 B2 * | 10/2006 | Szilagyi | ............... | B23Q 1/5462 60/527 |
| 2006/0269387 A1 * | 11/2006 | Yamaguchi | ............. | B08B 9/045 414/729 |
| 2016/0008989 A1 * | 1/2016 | Bakir | ........................ | B25J 9/06 74/490.03 |

OTHER PUBLICATIONS

Christian Cibert, "Bending, Twisting and Beating Trunk Robot Bioinspired from the '3 + 0' Axoneme", Bioinspiration & Biommetics, Apr. 12, 2013, pp. 1-12,IOP Publishing, http://iopscience.iop.org/1748-319018/2/026006.
C. Wright, et al., "Design and Architecture of the Unified Modular Snake Robot", 2012 International Conference on Robotics and Automation (ICRA 2012), pp. 4347-4354.
M. Rofl, et al., "Constant curvature continuum kinematics as fast approximate model for the Bionic Handling Assistant", IEEE/RSJ International Conference on Intelligent Robots and Systems (IROS), Vilamoura, Portugal: pp. 3440-3446.
G. Prensier, et al., Motile flagellum with "3+0 ultrastructure" Science, 207(4438), pp. 1493-1494. (Abstract Only).

* cited by examiner

*Primary Examiner* — Terence Boes
(74) *Attorney, Agent, or Firm* — Baker & Hostetler LLP

(57) ABSTRACT

A mechanism includes at least one module ($M_1$) having a tubular structure with at least three faces, each of said faces comprising: two parallel longitudinal fibers (1, 4), rigid and inextensible, whose ends are connected through respective ball or elastic joints (0-1; 4-0) to the ends of the fibers of contiguous modules, or to a base (0); a transverse link (2) connecting said two longitudinal fibers, having a first end rigidly connected to said first fiber and a second end slidably connected to said second fiber, said transverse link being inextensible and having two rotational degrees of freedom; a longitudinal link (32) connecting said transverse link to a homologous transverse link of an adjacent module or to a base via a ball or elastic joint (32-0) and an universal joint (3-32); and an actuator (A) for changing the length of said longitudinal link.

22 Claims, 7 Drawing Sheets

BENDING AND TWISTING MECHANISM AND ITS APPLICATIONS TO ROBOTICS AND ENERGY CONVERSION

FIELD OF THE INVENTION

The invention relates to a mechanism that is able to twist and bend, and to generate wave trains combining these two elementary movements.

The invention also relates to some applications of such a mechanism to the fields of robotic and energy conversion and more particularly ocean swell energy conversion.

BACKGROUND

"Snake" and "fish" robots are usually constituted by a series of independent modules separated by two articulated and motorized platforms—see the paper by C. Wright et al "Design and Architecture of the Unified Modular Snake Robot", 2012 International Conference on Robotics and Automation (ICRA 2012), pages 4347-54. Each module has two degrees of freedom and bends in two perpendicular planes according to the degrees of freedom defined by a universal joint that connects the two platforms. This architecture does not allow any twisting movement. If necessary, a twisting degree of freedom is provided by a dedicated mobile element, which adds sophistication. Such a structure is used to actuate swimming and crawling drones and also in some industrial robots, e.g. painting robots in the industry field.

An alternative solution is based on the use of series of Stewart's platforms, each of said platforms having 6 degrees of freedom allowing bending, twisting and translation. However, the translations may not be needed in many applications. In these cases, the availability of a translational degree of freedom becomes a drawback. A further disadvantage of these systems is that the actuators of each platform must support the weight of the other platforms of the series and their load. In addition, their weight carrying capacity is low due to their cantilever structure: the stress load on the actuators of the first platform is very large and the structure tends to sag under the weight of the total load.

Recently, pneumatic systems have been proposed to implement trunk robots having the same kinematics (bending without twisting) as snake/fish robots. These machines are inherently compliant, a property which is not acceptable in some applications. See the paper by M. Rofl and J. Steil "Constant curvature continuum kinematics as fast approximate model for the Bionic Handling Assistant" IEEE/RSJ Int. Conf. Intelligent Robots and Systems (IROS), Vilamoura, Portugal: 3440-3446.

SUMMARY OF THE INVENTION

The invention aims at providing a bending and twisting mechanism, suitable e.g. for actuating a "snake", "fish" or "trunk" robot, free from the above-mentioned drawbacks of the prior art. More particular, it aims at providing a mechanism with three actuated degrees of freedom (two bending d.o.f. and one twisting d.o.f.), which is stiff and has a high weight carrying capability.

The inventive mechanism is also suitable for other applications such as constituting a section of the spine of a humanoid robot and/or an energy conversion device.

The inventive mechanism is bio-inspired. More particularly, it is inspired on a particular kind of cytoskeletal structure responsible for the motion of cilia and flagella of eukaryotic cells, known as "3+0 axoneme". See the paper by Prensier, G., Vivier, E., Goldstein, S., & Schrevel, J. (1980) "Motile flagellum with a "3+0" ultrastructure" Science, 207 (4438), 1493-1494. It is worth stressing that axonemes are microscopic structures, with no known macroscopic equivalent. This is in sharp contrast with the conventional approach used in bio-inspired robotics, which consists in mimicking macroscopic biological structures (e.g. using actuators like skeletal muscles).

An object of the invention is then a mechanism including at least one module having a tubular structure with at least three faces, each of said faces comprising: two parallel longitudinal fibers, rigid and inextensible, each having a first end, called proximal end, and a second end, called distal end, each said fiber being common to two adjacent faces of the module, the proximal end of each said fiber being connected with three rotational degrees of freedom to the distal end of a homologous fiber of another module, called proximal module, or to a base; a transverse inextensible link connecting said two longitudinal fibers, having a first end rigidly connected to said first fiber and a second end connected to said second fiber with a sliding degree of freedom along said fiber and a rotational degree of freedom about it, such that each fiber of the module is connected to the first end of a transverse link and to the second end of another transverse link, each said transverse link comprising a first segment carrying said first end and a second segment carrying said second end, said two segments being interconnected with two rotational degrees of freedom about respective axes, one of said axes being parallel to either said first or said second segment and the other one of said axes being perpendicular to both said first axis and to a longitudinal direction of the module; a longitudinal link connecting said transverse link to a homologous transverse link of said proximal module or to said base via a first connection having three rotational degrees of freedom and a second connection having only two rotational degrees of freedom about respective axis perpendicular to each other and to said longitudinal link; and a device selected from: an actuator for changing the length of said longitudinal link, a prismatic joint and a power generating transducer for allowing a change of the length of said longitudinal link and generating electrical power as a result of such change.

According to different embodiments of such a mechanism, taking independently or in combination with each other:

Said or each said module may have exactly three faces.

Said or each said longitudinal link is connected to said or each said transverse link near its second end.

The mechanism may comprise a series of said modules, connected to each other through the ends of their longitudinal fibers.

Said modules connected in series may be substantially identical to each other, so that the mechanism has a periodic structure.

The mechanism may comprise at least two of said modules connected in series, and a tang connected to an end module of said series, called last module, and to the proximal module of said last module, called penultimate module, said tang comprising: a pyramid-shaped structure having as many rigid and inextensible links as there are longitudinal fibers in each said module, each said link having a first end connected to a respective longitudinal fiber of said penultimate module with two rotational degrees of freedom about respective axis perpendicular to each other and to the direction of said link, and a second end connected to a top of said pyramid with three rotational degrees of freedom; a star-shaped structure, with as many links as there are longitudinal fibers in each said module, each said link having a first end connected to a respective longitudinal fiber of said last module with one rotational degree of freedom about an axis parallel to said fiber and a sliding degree of freedom along said axis, and a second end rigidly connected to a center of said star, each said link being extensible and comprising a first segment carrying said first end and a second segment carrying said second end, said two segments being interconnected with two rotational degrees of freedom about respective axes, one of said axes being parallel to either said first or said second segment and the other one of said axes being perpendicular to said first axis and to a longitudinal direction of the module, and a shaft attached to the top of said pyramid with three rotational degrees of freedom and rigidly attached to the center of said star.

Said second end of said or at least one said transverse link may be slidably connected to a cantilever extending parallel to said second longitudinal fiber and secured thereto near its distal end.

Another object of the invention is an apparatus comprising such a mechanism, wherein each said longitudinal link is equipped with an actuator to change its length, and a processor for controlling said actuators independently of each other.

Yet another object of the invention is a humanoid robot having a backbone comprising such an apparatus.

Yet another object of the invention is a method of converting energy by using such a mechanism, wherein at least one of said longitudinal links is equipped with a power generating transducer for allowing a change of the longitudinal length of said link and generating electrical power as a result of such a change.

BRIEF DESCRIPTION OF THE DRAWINGS

Additional features and advantages of the present invention will become apparent from the subsequent description, taken in conjunction with the accompanying drawings, which show.

DETAILED DESCRIPTION

Figure 1:
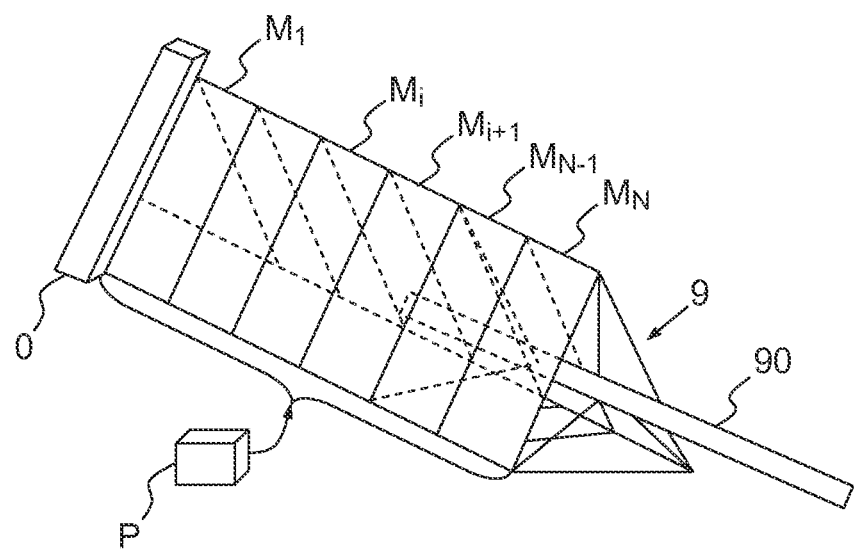
FIG. 1, a general view of the modular structure of a mechanism according to an embodiment of the invention.

As illustrated on FIG. 1, a mechanism according to the invention is generally in the form of a series of N modules $M_1, \ldots, M_i, M_{i+1}, \ldots, M_N$ having a tubular structure with a polygonal (in the case of FIG. 1, triangular) section. The first module $M_1$ is connected to a base 0 (e.g. the ground, a platform, a different part of a more complex robot, etc.) while the last module $M_N$ has a free distal end. Given a generic module $M_i$, the adjacent module to the base, $M_{i-1}$ is called "proximal", while the adjacent module away from the base, $M_{i+1}$ is called "distal". A shaft 90 is connected to the two last (counting from the base) modules $M_{N-1}$ and $M_N$ (see FIG. 3), and protrudes from the free end of the mechanism. The shaft 90 and the links connecting it to the penultimate and last modules $M_{N-1}$ and $M_N$ form what is called a "tang" 9. As mentioned above, and as it will be explained in detail below, the tang allows transferring bending and twisting movements to an external object.

Reference P corresponds to a processor (e.g. an external computer or an embarked processor) driving the actuators of the modules; As it will be discussed below, each of the faces of each module may comprise one actuator (or a power generating transducer). Some of the actuators or transducers may be replaced by a passive sliding joint (prismatic pair), preferably opposing a mechanical resistance to sliding.

In a particular embodiment, the mechanism may comprise a single module (N=1).

Advantageously, all the modules may be identical to each other, in which case the mechanism has a periodic structure. In an alternative embodiment, the modules may only differ by their longitudinal length ("quasi-periodic structure").

As illustrated on FIG. 1, each module has three (more generally, M≤3) planar faces. These faces have a common architecture, which is illustrated on FIGS. 2A and 2B. Advantageously, all the faces of a same module (and advantageously all the faces of a mechanism with a periodic structure) are identical to each other.

Figure 2A:
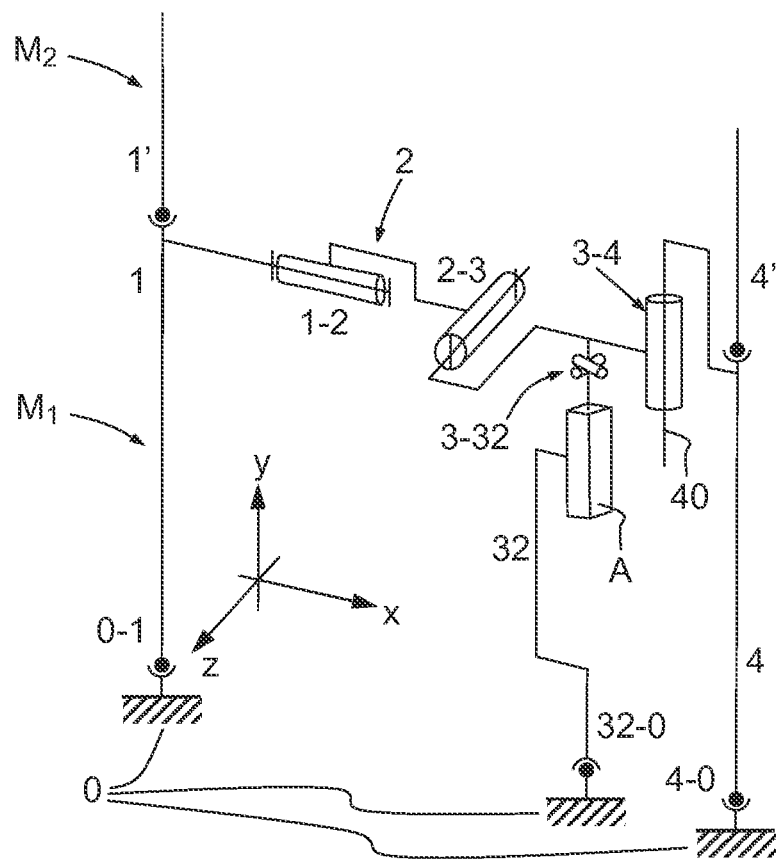
FIGS. 2A and 2B, the mechanical architecture of a face of a module of a (three-dimensional) mechanism according to the invention.

FIG. 2A shows the mechanical architecture of a face of the first module $M_1$ of the mechanism of FIG. 1.

The face comprises two longitudinal fibers 1 and 4, rigid and inextensible, which extend from the basis 0 to the distal module $M_2$. These fibers delimitate the face in a lateral direction, and each of them is common to a pair of adjacent faces of the same module. The fibers may be constituted e.g. by rods, beams or tubes, made of metal or other materials depending on the specific application considered.

Each fiber has a proximal end, toward the base 0, and a distal end, oriented toward the distal module $M_2$. The proximal end of each fiber is connected to the base 0 by a joint 0-1, 0-4 having three rotational degrees of freedom (d.o.f.); similarly, the distal end of each fiber is connected to the proximal module $M_2$ by a joint 1-1', 4-4' (also having three rotational d.o.f.) to the homologous fiber 1', 4' of the distal module $M_2$. The joints may be implemented in different forms, e.g. as ball joints or elastic joint.

The two fibers are connected—preferably near their distal ends—by a transverse link 2 having a first end which is connected rigidly to one of said fibers (1), and a second end which is connected to the other one of said fibers (4) with a sliding (translational) degree of freedom along said fiber and a rotational degree of freedom about it (cylindrical joint 3-4). As explained above, a fiber belongs to two adjacent faces, and therefore is connected to two transverse links. It is advantageous for each fiber to be connected rigidly to one of said transverse links, and to the other one through a joint allowing said link to slide along the fiber and to rotate around it (cylindrical joint 3-4).

It will be noted that cylindrical joint 3-4 is not directly connected to the fiber 4, but to a cantilever 40 parallel to said fiber and fixed to the latter near its distal end. The reason for this technological choice (which is not essential but very advantageous) will be explained later.

Transverse link 2 is inextensible, but not rigid. Indeed, it comprises at least two segments, carrying respective ends, said two segments being interconnected so as to have two rotational d.o.f.—one about a first axis parallel to the segment carrying the rigidly connected end, and the other one about a second axis perpendicular to both said first axis and a longitudinal direction of the module (otherwise stated, the second axis is substantially perpendicular to the face of the module to which it belongs). Alternatively, the first axis could be parallel to the second segment. In the embodiment of FIG. 2A, these two d.o.f. are implemented using two pivot (revolute) joints and an intermediate segment of the link, but other implementations are possible, e.g. using a single dedicated joint with the required d.o.f. or an elastic joint (the latter choice is less preferred because it introduces additional, unwanted, translational and rotational degrees of freedom).

The face also comprises a longitudinal (i.e. parallel to the fibers 1, 4) link 32 connected to the base 0 with three rotational d.o.f. (ball or elastic joint 32-0) and to the transverse link 2 with two rotational d.o.f. about respective axis perpendicular to each other and to the direction of said longitudinal link (universal joint 3-32). The opposite (universal joint or equivalent between the longitudinal link and the base and ball joint or equivalent between the longitudinal and the transverse links) is also possible. The universal joint and/or the ball joint can be replaced by elastic joints. They have the drawback of introducing an additional translational d.o.f., but the passive deformations introduced by said additional d.o.f. would be negligible in most applications. Moreover, if elastic joints are used, the actuators have to provide some additional power to deform them.

The longitudinal link is inflexible but extensible, as it comprises two segments, aligned in a longitudinal direction and interconnected through an actuator or transducer A (modeled as a prismatic pair), allowing a translational d.o.f. resulting in a change of length of the link. An actuator is used in "active" embodiments, used e.g. in robots, while a power generating transducer—which generates electrical power as a result of an externally induced translation of the two segments—is used in energy conversion applications. It should be noted that in some cases a same device (e.g. a D.C. electric motor) can be used both as an actuator and as a power generating transducer. In a mechanism used for energy conversion, power generating transducer may only be used in the longitudinal links of distal modules, whose movements have the greatest amplitudes that depend on the ratio: length of the mechanism vs. wavelength of the swell. Indeed, the movements of the modules nearest to the base have low amplitudes which do not allow efficient power generation. Therefore, in order to save costs, these modules may have longitudinal links comprising segments which slide freely along each other because sliding is cumulative along the mechanism.

In order to maximize the mechanical advantage for the actuator or transducer, the longitudinal link is connected to the transversal link as close as possible to the second (sliding) end of the latter.

Figure 2B:
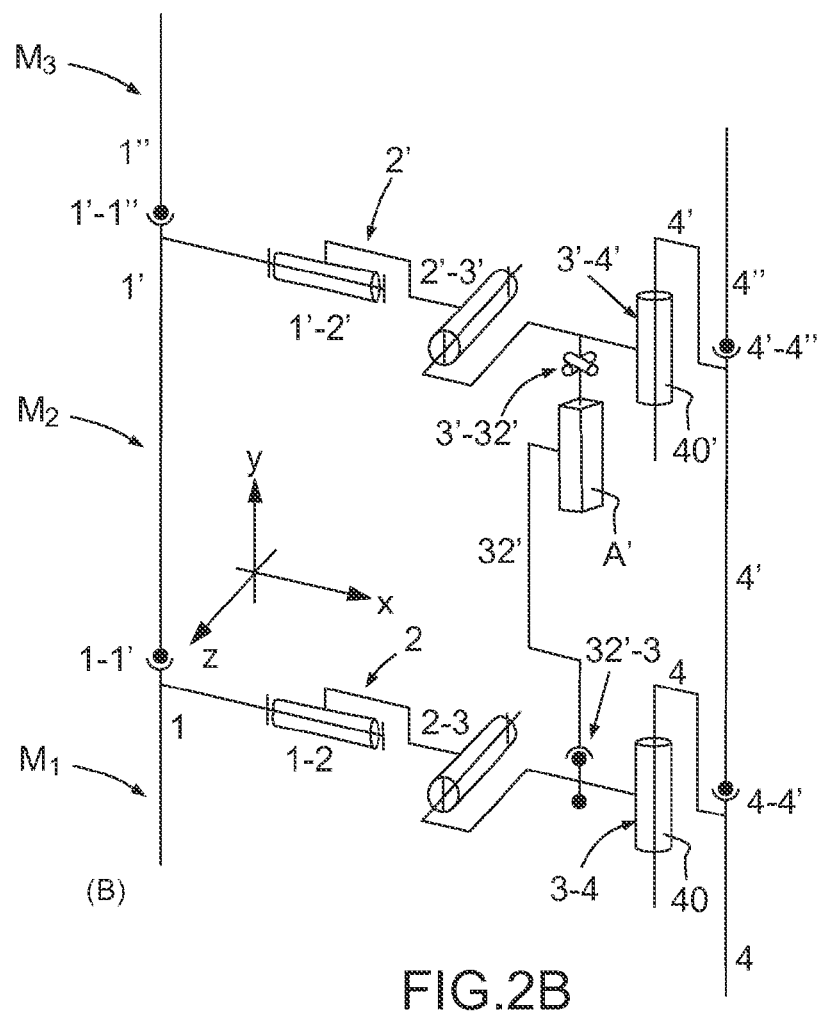

FIG. 2B shows the architecture of a face of module $M_2$. The only differences with respect to that of the module $M_1$ is that the proximal ends of the longitudinal fibers 1', 4' are connected to the distal ends of the homologous longitudinal fibers 1, 4 of the first module instead of to the base, and that the proximal end of the longitudinal link 32' is connected to the transversal link of $M_1$ instead of to the base. In FIG. 2B, the different elements of the mechanism are indicated by the same reference numbers than in FIG. 2A, except in that the elements of $M_2$ are primed and those of the distal module $M_3$ are double-primed.

The faces of modules $M_3$-$M_{N-1}$ have the same architecture. So have those of the last module $M_N$, except in that the distal ends of the longitudinal fibers are free.

The sides of the faces of the modules are constituted by inextensible fibers. Therefore it can be easily understood that, when the mechanism of FIG. 1 bends, its distal ends (i.e. the distal ends of the fibers of the last module) lie in a plane which remains approximately parallel to the base 0; this can be seen on FIG. 5 and, even more clearly, on FIGS. 4B and 4C. For this reason, a specific device (called a "tang")—reference 9 on the figures—may be provided to ease the transfer of the bending and twisting movement at the end of the series of modules to an external object. The mechanical architecture of this device is illustrated very schematically on FIG. 1, and in detail on FIG. 3.

Figure 3:
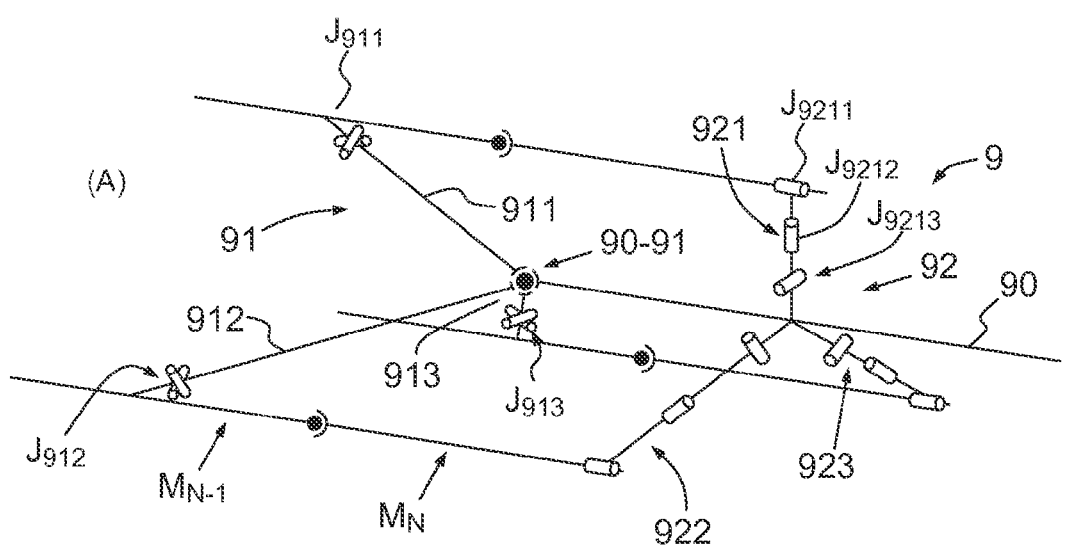
FIG. 3, the mechanical architecture of a "tang" of a mechanism according to the invention.

As shown on FIG. 3, the tang comprises a shaft 90 protruding from the distal end of the mechanism, connected to the penultimate module $M_{N-1}$ through a pyramid-shaped structure 91 having as many rigid and inextensible links as there are longitudinal fibers in each said module (three, in the present example) and to the last module $M_N$ through a star-shaped structure 92 with as many rigid and extensible links as there are longitudinal fibers in each said module (again, three).

In the pyramid-shaped structure 91, the inextensible links 911, 912 and 913 are connected to respective longitudinal fibers of the penultimate module $M_{N-1}$ with two rotational degrees of freedom about respective axis perpendicular to each other and to the direction of said link (universal joints $J_{911}$ $J_{912}$ and $J_{913}$). They are connected with three rotational degrees of freedom (ball or elastic joints) to a pyramid top or apex 90-91. The shaft 90 is also connected—also with three rotational degrees of freedom—to the same apex.

In the star-shaped structure 92, the extensible links 921, 922, 923 are connected to:
a respective longitudinal fiber of the last (distal) module $M_N$ with one rotational degree of freedom about an axis parallel to said fiber and one sliding degree of freedom along said axis (cylindrical joint $J_{9212}$ on link 921, similar joints being provided on the other links of the star structure; as discussed for transversal links 2, 2', these cylindrical joints may slide along cantilevers extending parallel to the fiber and connected near the distal end of said fiber), and
rigidly to shaft 90, at the center of the star.

Each of said links comprises a first segment, directed toward the longitudinal fiber, and a second segment, directed toward the center of the star. The segments are interconnected with a first rotational degree of freedom about an axis parallel to said first segment (cylindrical joint $J_{9212}$ on link 921, also providing the sliding or gliding d.o.f. making the link extensible) and a second rotational degree of freedom about a second axis perpendicular to said first axis and to a longitudinal direction of the module (pivot or revolute joint $J_{9213}$ on link 921). In the figure, the longitudinal direction of the module coincides with that of the shaft 90. Alternatively, the first axis could be parallel to the second segment. In the embodiment of FIG. 3, these two d.o.f. are implemented using two pivot (revolute) joints and an intermediate segment of the link, but other implementations are possible, e.g. using a single dedicated joint with the required d.o.f. or an elastic joint (the latter choice is less preferred because it introduces additional, unwanted, translational and rotational degrees of freedom).

Figure 5:
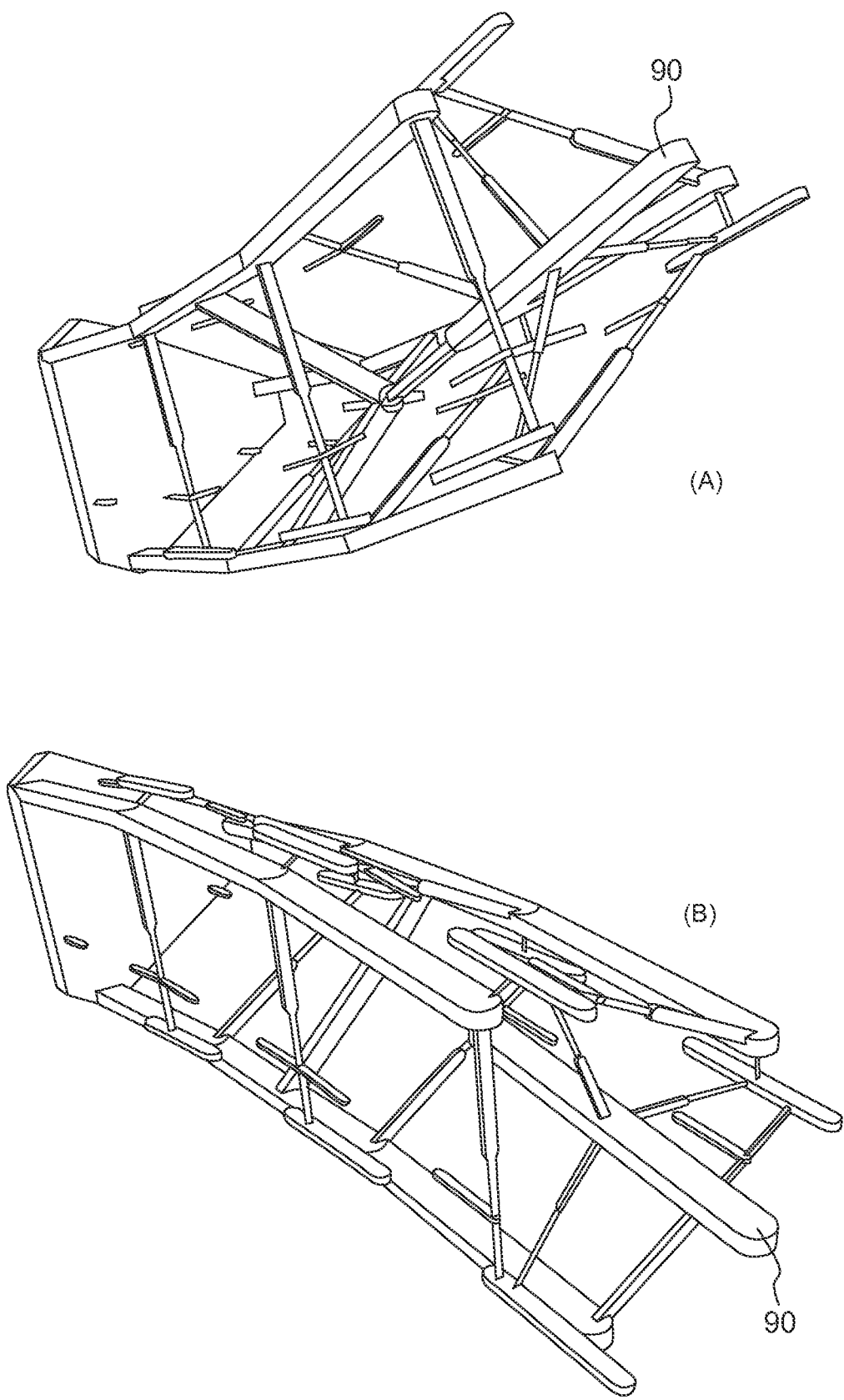
FIG. 5, two views of a mechanism according to the invention bending to the left and to the right, respectively.
Figure 6:
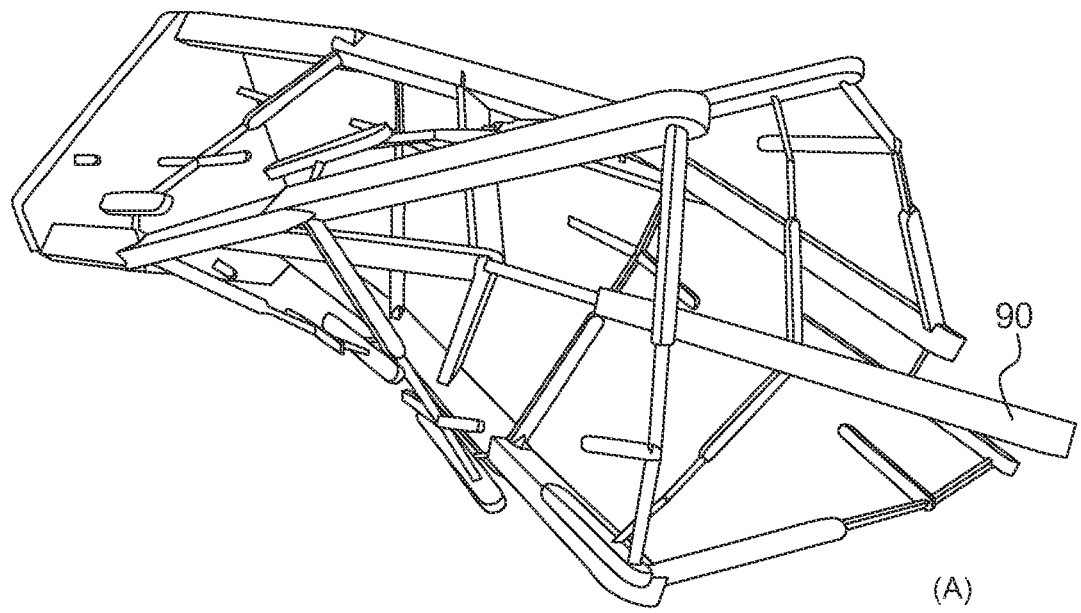
FIG. 6, two views of a mechanism according to the invention twisting to the left and to the right, respectively.
Figure 6:
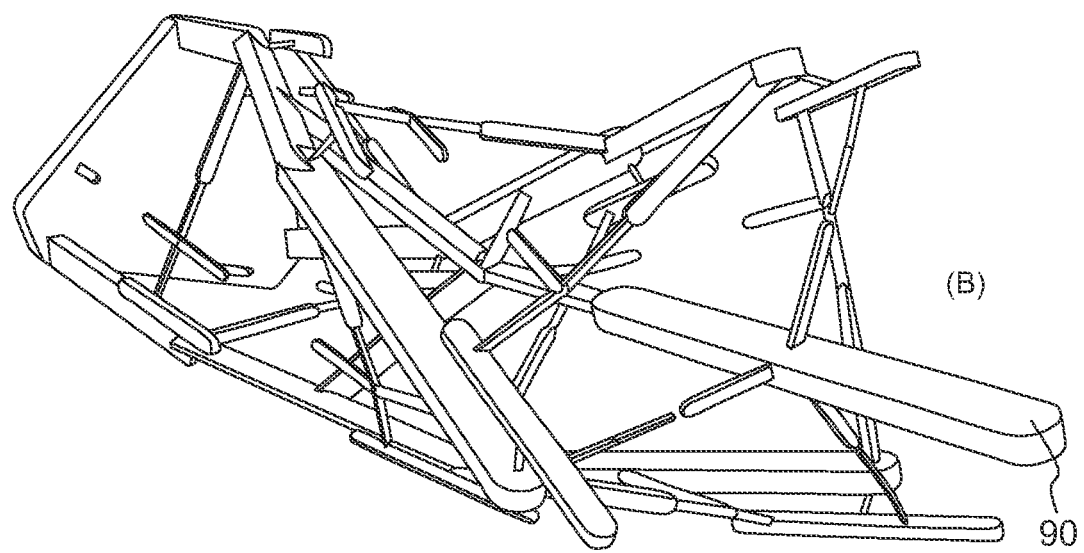

As it can be seen on FIG. 5, when the mechanism bends the shaft 90 of the tang 9 is approximately parallel to the longitudinal fibers of the last module; FIG. 6 shows that the shaft rotates when the mechanism twists. A very advantageous feature of the inventive mechanism, compared e.g. to the Stewart platform, is that the actuators A do not support the constraints applied on the tang, because these forces are mainly transferred on the longitudinal fibers. Moreover, the shaft of the tang has no translational degree of freedom, which is desirable in some applications. If necessary, a prismatic joint may be mounted on the tang to allow a translational movement). An actuated prismatic joint may be used e.g. to compensate for the slight reduction of the mechanism length that unavoidably accompanies twisting.

Figure 4A:
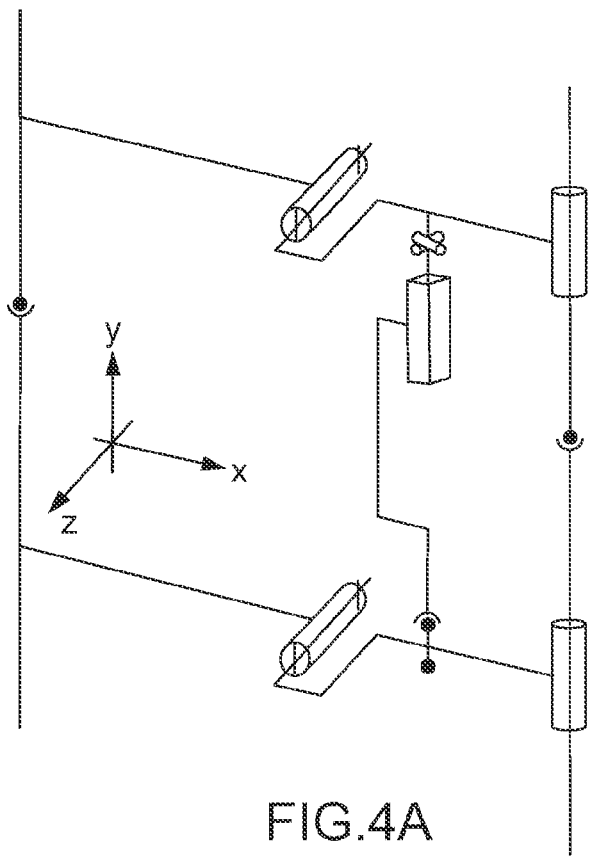
FIGS. 4A, 4B and 4C, the mechanical architecture and the planar bending of a simplified two-dimensional mechanism, illustrating the operation of a mechanism according to the invention.

In order to explain the operation of the inventive mechanism, reference will be made to a simplified, two-dimensional model, whose mechanical architecture is illustrated on FIG. 4A. This model differs from that of a face of the complete three-dimensional mechanism by the fact that the transverse link has a single rotational d.o.f. about an axis perpendicular to the link itself. Moreover, the sliding end of the transverse link is mounted directly on a longitudinal fiber, without a cantilever as in FIGS. 2A and 2B.

Figure 4B:
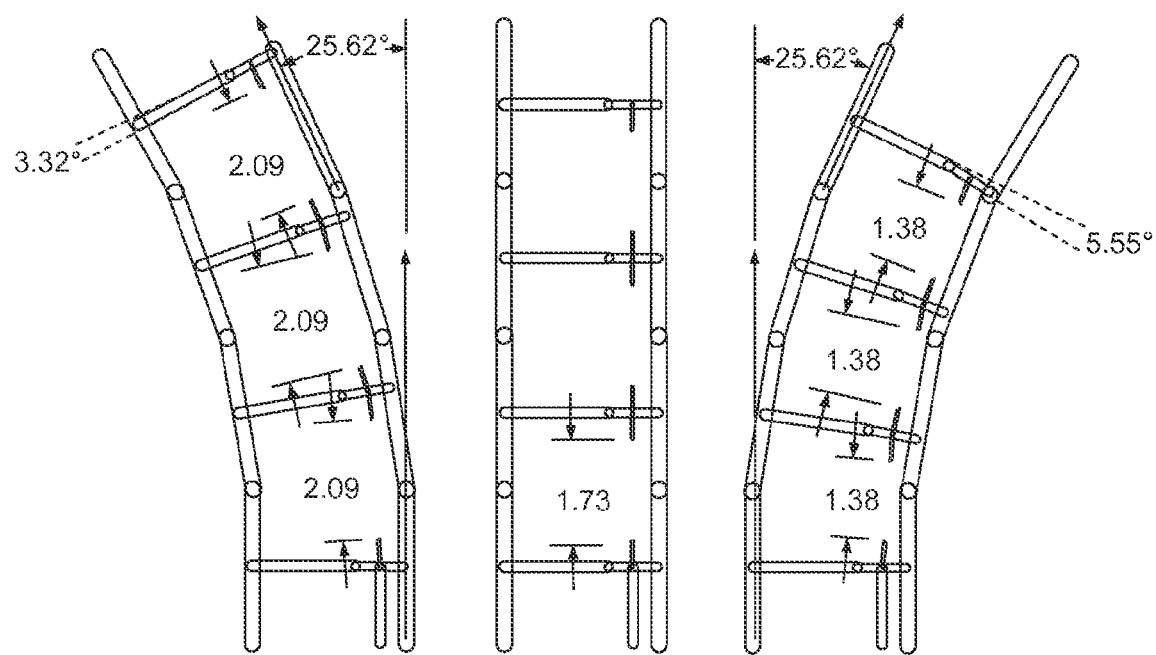
Figure 4C:
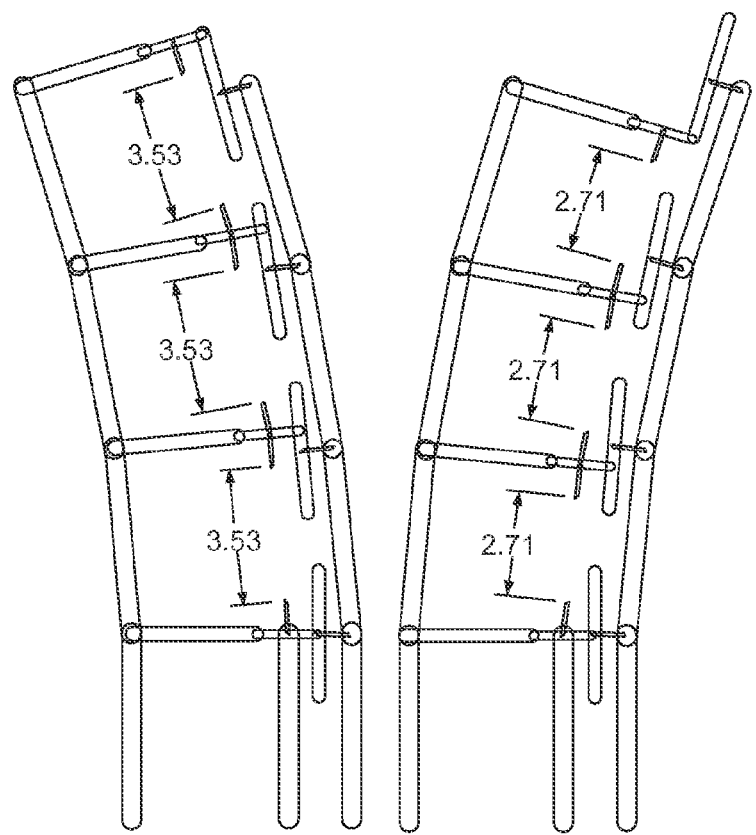

FIG. 4B shows that, when the actuator changes the length of the longitudinal links of the two-dimensional mechanism, the latter bends. An elongation of the links from 1.73 to 2.09 arbitrary units induces a bend to the left of 25.62° (defined as the angle formed by the prolongation of the outer—i.e. right—fiber of the first or lowest module and the prolongation of the outer fiber of the last module). Similarly, a contraction of the links from 1.73 units to 1.38 arbitrary units induces a bend to the right of 25.62° (defined as the angle formed by the prolongation of the outer—i.e. left—fiber of the first or lowest module and the prolongation of the outer fiber of the last module). However, the line joining the distal ends of the fiber remains almost horizontal because the lengths of the longitudinal fibers remain constant. More precisely, the inclination of this line is given by the angle formed by lines which are perpendicular to the fibers of the last module; the value of this angle is 3.32° for the bent to the left and 5.55° for the bent to the right (the values are different from each other because the mechanism is asymmetric). This illustrates the need for a tang.

The maximal flexion of the two-dimensional mechanism (but this is also true for the three-dimensional one) is limited by the fact that the sliding end of the transversal links of the last module comes into abutment with one of the ball joints of the longitudinal fiber. If a symmetric flexion is wanted, when the mechanism is straight said sliding end of the transversal link should be situated at the middle of the longitudinal fiber.

The right panel of FIG. 4B shows that a problem occurs when the sliding joint of the transverse link moves baseward and comes into abutment with the ball joint at the proximal end of the fiber. In this case, the distal end of the longitudinal fiber of the last module is at odds. As illustrated on FIG. 4C, a possible solution consists in mounting the sliding ends of the longitudinal fibers on longitudinal cantilevers fixed near the distal ends of the fibers and extending both tipward (i.e. toward the distal end, or tip, of the fibers) and baseward.

This solution is also used in the three-dimensional mechanism (FIGS. 2A and 2B).

FIG. 5 illustrates the bending movement of the three-dimensional mechanism of FIGS. 1, 2A and 2B. Such a movement is obtained by extending, using the corresponding actuators, the longitudinal links of the faces on the external side of the bent, and by retracting by a same amount, also using the corresponding actuators, the longitudinal links of the other faces.

FIG. 6 illustrates the twisting movement of the three-dimensional mechanism of FIGS. 1, 2A and 2B. Such a movement is obtained by extending or retracting, using the corresponding actuators, all the longitudinal links by a same amount.

In vivo axonemes induce undulating movements of cellular flagella and cilia. Similarly, it is possible to obtain a two- or three-dimensional wave train propagating along the series of modules of a mechanism according to the invention. This is illustrated on FIG. 7, wherein:

curve D illustrates the instantaneous shape of the undulating mechanism;

curve E corresponds to the envelope of the planar wave train propagating along the mechanism;

curve S corresponds to the instantaneous displacement of the actuators or, equivalently, to the instantaneous sliding displacement of the second ends of the transverse links; and curve SE corresponds to the envelope of said instantaneous displacement during a cycle of the wave.

Figure 7:
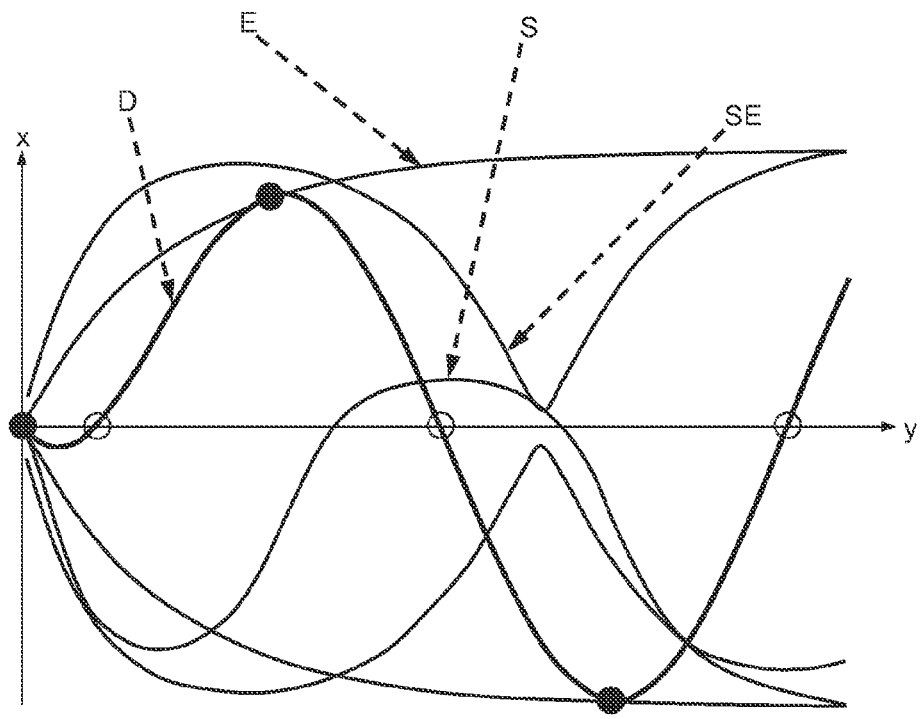
FIG. 7, a train of waves propagating along a mechanism according to the invention, constituted by a long series of modules.

FIG. 7 is based on a continuous approximation—i.e. the mechanism is considered to consist of an infinite number of infinitely short modules.

To obtain a planar wave train of the kind of FIG. 7, the actuators of the mechanisms are driven according to the following law:

$$\Delta y = \pm \frac{A}{1 - e^{-B \cdot (n-1) - C}} \sin[D \cdot (n-1) + \pi \cdot t]$$

where $\Delta y$ is the displacement of the actuator, "n" is the rank of the module along the series (starting from the base), A, B, C and D are constants and "t" is time.

More complex patterns, e.g. including twisting, are also possible.

A mechanism undulating as illustrated in FIG. 1 can be used to move an undulating or a swimming robot. In the latter case, the robot "swims" like a spermatozoon.

Figure 8:
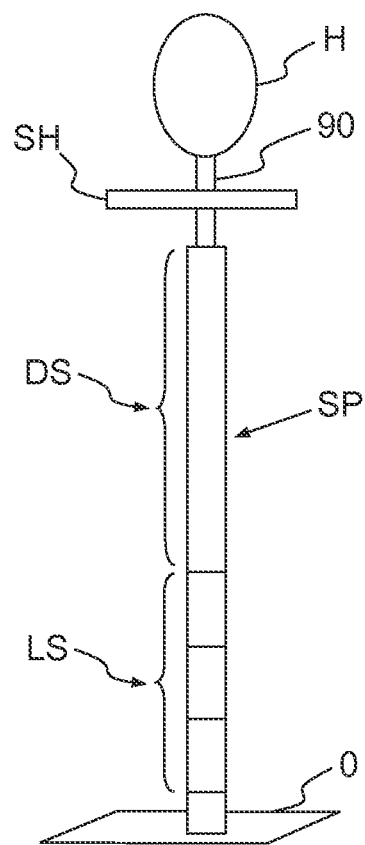
FIG. 8, the use of a mechanism according to an embodiment of the invention as a backbone or spine of a humanoid robot.
Figure 9:
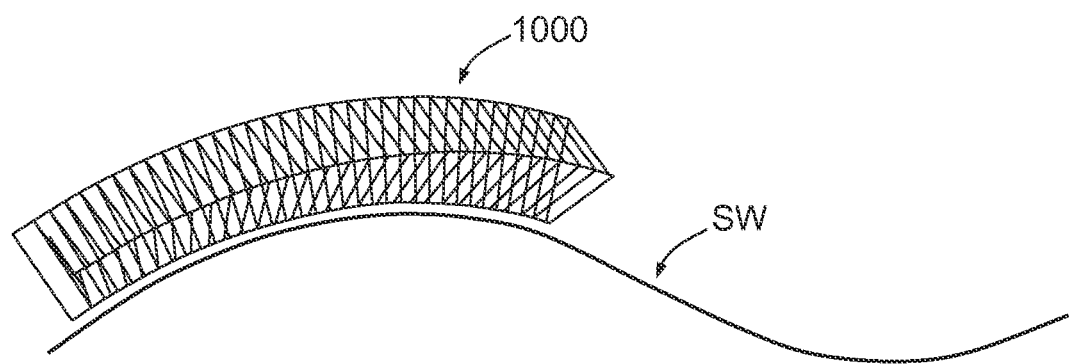
FIG. 9, the use of a mechanism according to an embodiment of the invention for recovering the energy of sea waves.

Other possible applications of the inventive mechanism are illustrated on FIGS. 8 and 9.

FIG. 8 shows a partial (and simplified) view of a humanoid robot, whose "spine" SP comprises a "lumbar" section LS constituted by a three-section mechanism according to the invention and a rigid "dorsal" section DS, the basis 0 corresponding to the "pelvis" and the tang 90 to the "neck", on which a "head" H is mounted. A transverse bar SH fixed perpendicular to the tang constitutes the "shoulders" of the robot, to which the arms are mounted.

FIG. 9 refers to a completely different application, namely the conversion of the energy of sea waves and more particularly ocean swell. This figure shows a mechanism 1000 according to the invention, floatable and having power generating transducers (e.g. piezoelectric or electromechanical transducers) instead of actuators, floating on the surface of the sea. Ocean swell SW induces an undulating movement of the mechanism; the transducers convert the kinetic energy of this movement into electric power which is collected by a cable (not shown).

As some devices can be used both as actuators and as electric power generators, a same mechanism can be used both as an "active" machine (e.g. a robot) and as a "passive" energy conversion machine.

The invention claimed is:

1. A mechanism including at least one module having a tubular structure with at least three faces, each of said faces comprising:
   two parallel longitudinal fibers, rigid and inextensible, each having a first end, called proximal end, and a second end, called distal end, each said fiber being common to two adjacent faces of the module, the proximal end of each said fiber being connected with three rotational degrees of freedom to the distal end of a homologous fiber of another module, called proximal module, or to a base;
   a transverse inextensible link connecting said two longitudinal fibers, having a first end rigidly connected to said first fiber and a second end connected to said second fiber with a sliding degree of freedom along said fiber and a rotational degree of freedom about it, such that each fiber of the module is connected to the first end of a transverse link and to the second end of another transverse link, each said transverse link comprising a first segment carrying said first end and a second segment carrying said second end, said two segments being interconnected with two rotational degrees of freedom about respective axes, one of said axes being parallel to either said first or said second segment and the other one of said axes being perpendicular to both said first axis and to a longitudinal direction of the module;
   a longitudinal link connecting said transverse link to a homologous transverse link of said proximal module or to said base via a first connection having three rotational degrees of freedom and a second connection having only two rotational degrees of freedom about respective axis perpendicular to each other and to said longitudinal link; and
   a device selected from: an actuator for changing the length of said longitudinal link, a prismatic joint and a power generating transducer for allowing a change of the length of said longitudinal link and generating electrical power as a result of such change.

2. A mechanism according to claim 1, wherein said or each said module has exactly three faces.

3. A mechanism according to claim 1, wherein said or each said longitudinal link is connected to said or each said transverse link near its second end.

4. A mechanism according to claim 1, comprising a series of said modules, connected to each other through the ends of their longitudinal fibers.

5. A mechanism according to claim 4, wherein said modules connected in series are substantially identical to each other, so that the mechanism has a periodic structure.

6. A mechanism according to claim 1, comprising at least two of said modules connected in series, and a tang connected to an end module of said series, called last module, and to the proximal module of said last module, called penultimate module, said tang comprising:
   a pyramid-shaped structure having as many rigid and inextensible links as there are longitudinal fibers in each said module, each said link having a first end connected to a respective longitudinal fiber of said penultimate module with two rotational degrees of freedom about respective axis perpendicular to each other and to the direction of said link, and a second end connected to a top of said pyramid with three rotational degrees of freedom;
   a star-shaped structure, with as many links as there are longitudinal fibers in each said module, each said link having a first end connected to a respective longitudinal fiber of said last module with one rotational degree of freedom about an axis parallel to said fiber and a sliding degree of freedom along said axis, and a second end rigidly connected to a center of said star, each said link being extensible and comprising a first segment carrying said first end and a second segment carrying said second end, said two segments being interconnected with two rotational degrees of freedom about respective axes, one of said axes being parallel to either said first or said second segment and the other one of said axes being perpendicular to said first axis and to a longitudinal direction of the module, and
   a shaft attached to the top of said pyramid with three rotational degrees of freedom and rigidly attached to the center of said star.

7. A mechanism according to claim 1, wherein said second end of said or at least one said transverse link is slidably connected to a cantilever extending parallel to said second longitudinal fiber and secured thereto near its distal end.

8. An apparatus comprising a mechanism according to claim 1, wherein each said longitudinal link is equipped with an actuator to change its length, and a processor for controlling said actuators independently of each other.

9. A humanoid robot having a backbone, comprising an apparatus according to claim 8.

10. An apparatus comprising a mechanism according to claim 2, wherein each said longitudinal link is equipped with an actuator to change its length, and a processor for controlling said actuators independently of each other.

11. A humanoid robot having a backbone, comprising an apparatus according to claim 10.

12. An apparatus comprising a mechanism according to claim 3, wherein each said longitudinal link is equipped with an actuator to change its length, and a processor for controlling said actuators independently of each other.

13. A humanoid robot having a backbone, comprising an apparatus according to claim 12.

14. An apparatus comprising a mechanism according to claim 4, wherein each said longitudinal link is equipped with an actuator to change its length, and a processor for controlling said actuators independently of each other.

15. A humanoid robot having a backbone, comprising an apparatus according to claim 14.

16. An apparatus comprising a mechanism according to claim 5, wherein each said longitudinal link is equipped with an actuator to change its length, and a processor for controlling said actuators independently of each other.

17. A humanoid robot having a backbone, comprising an apparatus according to claim 16.

18. An apparatus comprising a mechanism according to claim 6, wherein each said longitudinal link is equipped with an actuator to change its length, and a processor for controlling said actuators independently of each other.

19. A humanoid robot having a backbone, comprising an apparatus according to claim 18.

20. An apparatus comprising a mechanism according to claim 7, wherein each said longitudinal link is equipped with an actuator to change its length, and a processor for controlling said actuators independently of each other.

21. A humanoid robot having a backbone, comprising an apparatus according to claim 20.

22. A method of converting energy by using a mechanism according to claim 4, wherein at least one of said longitudinal links is equipped with a power generating transducer for allowing a change of the longitudinal length of said link and generating electrical power as a result of such a change.

* * * * *